March 3, 1964 R. S. WOOD 3,123,011
PUMPS AND MOTORS HAVING INTER-MESHING ROTORS
Filed Jan. 14, 1963

INVENTOR
ROBERT SPURGEON WOOD
BY William E. P. Daigh
ATTORNEY

United States Patent Office 3,123,011
Patented Mar. 3, 1964

3,123,011
PUMPS AND MOTORS HAVING INTER-MESHING ROTORS
Robert Spurgeon Wood, Alverstoke, Gosport, England, assignor to The Plessey Company Limited, Ilford, England, a British company
Filed Jan. 14, 1963, Ser. No. 251,279
2 Claims. (Cl. 103—126)

This invention relates to hydraulic pumps and motors having inter-meshing rotors, such pumps and motors being hereinafter generally referred to as gear pumps and motors of the kind in which three inter-engaging lobed rotors hereinafter called gears are arranged in such manner that one central gear meshes with the two others. It is an object of the invention to provide improved gear pumps of the kind specified combining a simple construction with a high volumetric efficiency.

In gear pumps and motors employing two gears, effective seal between the gears and the wall of the pump housing can be ensured by supporting the gear-journals in bearing blocks that fit with a certain amount of play into the same bores of the body, or bores coaxial with the bores of the body, which are to co-operate with the gear tips. In this case the hydraulic load on the gears ensures that the gears and bearings move towards the low-pressure side of the pump, at which as a result minimum clearance is maintained for sealing off the high-pressure fluid, even when the body of the pump (or motor) expands due to the internal pressure.

Figure 1:
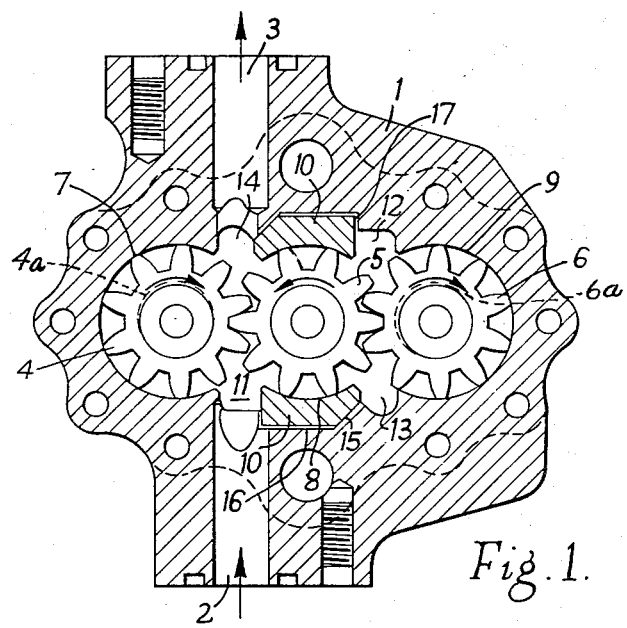
Figure 2:
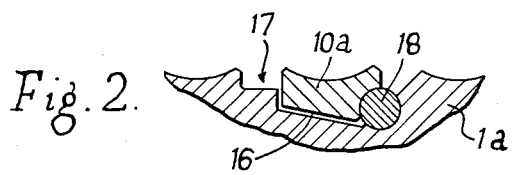
Figure 3:
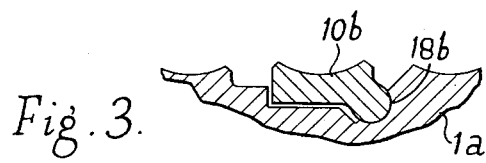
Figure 4:
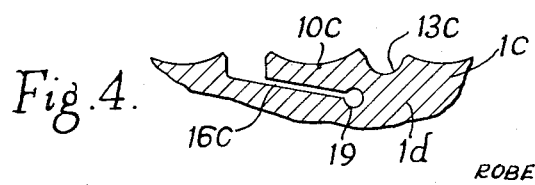

In the case of a pump or motor of the kind specified this arrangement does not, however, ensure reliable sealing of the central gear because the forces acting upon the central gear are substantially equal and opposite, so that the central gear is not biased against any particular part of the pump body. In pumps of this kind as hitherto constructed an appreciable leakage path is therefore liable to remain from high-pressure to low-pressure over the tips of the gear teeth at each side of the central gear, even if the gears are capable of limited radial movement. Moreover, if the pump or motor body is deflected by internal pressure, this clearance is increased with a consequent further lowering of the volumetric efficiency. According to the present invention wall portions forming the seal with the circumference of the central gear at the two sides of the plane containing the axes of the other gears are movably arranged in the pump or motor housing and loaded by pressure from the high-pressure side of the pump or motor, so as to remain in contact with the periphery of the central gear. In the accompanying drawing:

FIGURE 1 is a sectional elevation of one form of gear pump or motor employing three inter-meshing toothed-wheel rotors and embodying one form of the invention, FIGURES 2, 3 and 4 are fragmentary views of similar pumps incorporating modified embodiments of the invention.

Referring now first to FIGURE 1 and particularly to the embodiment of the invention in a gear motor, the gear motor comprises a housing body 1 having an inlet 2 and an outlet 3 and three toothed-wheel rotors or gears 4, 5 and 6, which have journals 4a, 5a and 6a and are rotatable in substantial contact with substantially cylindrical bores, 7, 8 and 9. While the bores 7 and 9 are formed in the conventional way in the housing body 1 itself, sealing contact of their gear tips with the wall of their respective bores being ensured by the unilateral hydraulic load acting on each of these gears, utilising the limited radial play provided in the usual manner in the mounting of their journals, as diagrammatically indicated in the drawing, the bore 8 is formed in a pair of separate side-wall elements 10 which are movable in the housing 1 towards and away from the axis of gear 5. Two high-pressure chambers 11 and 12 and two low-pressure chambers 13 and 14 are formed in the housing between the bores 7, 8, and 9, corresponding chambers being interconnected in a conventional manner for the operation of the motor with the gears turning in the directions indicated by the arrows. Each movable wall element 10 is in sealing contact with the housing body 1 on inclined surfaces 15 but is spaced from the housing body at the side of the element facing away from the gear 5, by a gap 16 which is extended at 17 to establish communication of the gap 16 with one of the high-pressure chambers 11 or 12, so that the high pressure from chamber 11 or 12 will act in the gap 16 to force the wall member 10 into sealing engagement with the tips of the teeth of gear 5 and will also act on the end adjacent to the high-pressure chamber of the block 10 to hold the inclined surface 15 in sealing contact with the housing body 1. When the motor is in operation, the pressure in chambers 11 and 12 will urge the gears 4 and 6 into sealing contact with the housing at the inclined surfaces 15 while sealing between the housing and the teeth of gear wheel 5 is established in the above-described manner via the blocks 10.

While in FIGURE 1 liquid-tight connection between each element 10 and the body 1 adjacent the low pressure chambers 13 and 14 have been established by the provision of the inclined surfaces 15, FIGURES 2, 3 and 4 show three alternative methods in which such liquid-tight connection may be established. In FIGURE 2 the movable wall elements have been indicated at 10a. They are supported in the housing body 1a adjacent to the low-pressure chamber by a cylindrical bolster piece 18 which fits into part-cylindrical recesses of the wall element 10a and the housing body 1a, thus facilitating rocking movement of the wall element 10a, about the axis of the cylinder 18. In the embodiment illustrated in FIGURE 3 a similar result is achieved by the provision of a wall element 10b which may be considered as an integral piece combining the wall element 10a with the cylindrical bolster piece shown as 18b, rocking movement of the body 10b being possible similarly as in FIGURE 2 except that the cylinder surface of part 18b will move jointly with the remainder of the body 10b.

FIGURE 4 shows another modification, in which a movable wall element 10c is formed as an integral part of the housing body 1c with which it is joined adjacent to the low-pressure chamber 13c (or 14c) by a relatively narrow neck portion 1d formed by a cylindrical widening 19 of the end of gap 16c so that some movement of the wall member towards and away from the centre of gear wheel 5 is possible by resilient deflection of the neck portion 1d.

Although the embodiment of the invention has been described with reference to a gear motor, the description applies equally to a gear pump if the direction of rotation of the gears and the functions of the parts 2 and 3 are reversed.

What I claim is:
1. A rotary-displacement machine comprising a housing having a displacement chamber, two outer lobed displacement rotors mounted in the housing for rotation and limited radial movement in said chamber and a central rotor mounted in the housing for rotation in inter-meshing engagement with each of the outer rotors, and the periphery of each rotor in substantially sealing engagement with the housing along part of the circumference of the chamber between all consecutive zones of intermesh so as to mutually isolate four parts of said chamber each confined between the zone of intermesh of two adjacent rotors and two mutually adjacent points of sealing contact of the housing with the peripheries of said rotors, the housing including a main housing body and two wall portions, respectively containing the areas of sealing contact with the central rotor and each mounted in said housing body for movement towards and away from the periphery of the central rotor, the housing including a pressure chamber at the outer side of each said movable wall portion, said movable wall portion forming part of the wall of the pressure chamber, and passage means establishing communication between each said pressure chamber and at least one of said four parts of the chamber.

2. A gear-type rotary displacement machine, comprising a housing having a gear chamber, two outer gears mounted in the housing for rotation and limited radial movement in the gear chamber and a central gear mounted in the housing for rotation in the gear chamber in intermeshing engagement with each of the outer gears, and with the periphery of each gear in slidable sealing engagement with the housing between all consecutive zones of intermesh so as to mutually isolate four parts of the gear chamber each confined between a zone of intermesh of two gears and two mutually adjacent points of sealing contact of the housing with the peripheries of said gears, the housing including a main housing body and two wall portions respectively containing the areas of contact with the periphery of the central gear and each mounted in the housing for movement towards and away from said periphery, the housing being formed with a pressure chamber at the outer side of each said movable wall portion, said movable wall portion forming part of the wall of the pressure chamber, and passage means in said housing establishing communication between each said pressure chamber and at least one of said parts of the gear chamber.

References Cited in the file of this patent

UNITED STATES PATENTS

| | | |
|---|---|---|
| 1,783,209 | Wilsey | Dec. 2, 1930 |
| 2,163,652 | Wilkin | June 27, 1939 |
| 2,801,593 | Mosbacher | Aug. 6, 1957 |
| 2,923,249 | Lorenz | Feb. 2, 1960 |

FOREIGN PATENTS

| | | |
|---|---|---|
| 735,457 | Germany | May 14, 1943 |